US012275862B2

(12) United States Patent
Moore et al.

(10) Patent No.: US 12,275,862 B2
(45) Date of Patent: Apr. 15, 2025

(54) FOUL RELEASE COATING COMPOSITION

(71) Applicant: Akzo Nobel Coatings International B.V., Arnhem (NL)

(72) Inventors: David Moore, Durham (GB); Uwe Scheim, Nünchritz (DE); Kevin John Reynolds, Tyne and Wear (GB); Alison Louise Parry, Durham (GB); Graeme Dunford, Tyne and Wear (GB); Clayton Price, Tyne and Wear (GB); Robin Alexander Heath, Tyne and Wear (GB)

(73) Assignee: Akzo Nobel Coatings International B.V., Amsterdam (NL)

( * ) Notice: Subject to any disclaimer, the term of this patent is extended or adjusted under 35 U.S.C. 154(b) by 16 days.

(21) Appl. No.: 16/477,159

(22) PCT Filed: Jan. 12, 2018

(86) PCT No.: PCT/EP2018/050711
§ 371 (c)(1),
(2) Date: Jul. 10, 2019

(87) PCT Pub. No.: WO2018/134124
PCT Pub. Date: Jul. 26, 2018

(65) Prior Publication Data
US 2020/0024462 A1    Jan. 23, 2020

(30) Foreign Application Priority Data
Jan. 17, 2017   (EP) .................................. 17151859

(51) Int. Cl.
C09D 5/16       (2006.01)
C08G 77/14      (2006.01)
C08G 77/26      (2006.01)
C08G 77/388     (2006.01)
C09D 183/08     (2006.01)

(52) U.S. Cl.
CPC ........... C09D 5/1675 (2013.01); C08G 77/14 (2013.01); C08G 77/26 (2013.01); C08G 77/388 (2013.01); C09D 183/08 (2013.01)

(58) Field of Classification Search
CPC .. C09D 5/1675; C09D 5/1693; C09D 183/08; C09D 5/16; C09D 5/00; C09D 5/002; C09D 133/068; C08G 77/14; C08G 77/26; C08G 77/388; C08K 5/0058
See application file for complete search history.

(56) References Cited

U.S. PATENT DOCUMENTS

| 3,702,778 | A | 11/1972 | Mueller et al. | |
|---|---|---|---|---|
| 2007/0073028 | A1* | 3/2007 | Hupfield | C08G 77/08 |
| | | | | 528/38 |
| 2008/0107815 | A1* | 5/2008 | Schneider | C08J 5/18 |
| | | | | 524/588 |
| 2009/0042042 | A1 | 2/2009 | Yuki et al. | |
| 2009/0234071 | A1* | 9/2009 | Martz | C08G 77/46 |
| | | | | 525/477 |
| 2013/0172193 | A1 | 7/2013 | Saxena et al. | |
| 2014/0141263 | A1* | 5/2014 | Jones | C09D 5/1625 |
| | | | | 427/407.1 |
| 2015/0329724 | A1* | 11/2015 | Maliverney | B01J 31/2213 |
| | | | | 428/447 |
| 2015/0361280 | A1 | 12/2015 | Reynolds et al. | |
| 2019/0153166 | A1* | 5/2019 | Scheim | C08K 5/17 |

FOREIGN PATENT DOCUMENTS

| CN | 101134887 | | 3/2008 |
|---|---|---|---|
| EP | 0628603 | A2 * | 12/1994 |
| EP | 0709358 | | 11/1996 |
| EP | 0628603 | | 12/1998 |
| EP | 0880892 | | 12/1998 |
| EP | 1115282 | | 7/2001 |
| EP | 1142477 | | 6/2004 |
| EP | 1013347 | | 5/2005 |
| EP | 2161318 | | 3/2010 |
| EP | 1791424 | | 5/2010 |
| FR | 2761367 | | 10/1998 |
| GB | 1307001 | | 2/1973 |
| JP | 7116362 | B * | 12/1995 |
| JP | 2001348430 | | 12/2001 |

(Continued)

OTHER PUBLICATIONS

English machine translation of CN101134887 (2008).*
1-butanamine alkoxysilane ACS( 2021).*
English machine translation JP2007-238820 (2007).*
English machine translation JP07-116362 B (1995).*
"International Search Report and Written Opinion," for PCT Application No. PCT/EP2018/050711 mailed Jul. 26, 2018 (10 pages).
"Examination Report," for Korean Patent Application No. 10-2019-7023121 mailed Oct. 5, 2020 (6 pages) with English Summary.

(Continued)

Primary Examiner — John D Freeman
(74) Attorney, Agent, or Firm — Pauly, DeVries Smith & Deffner LLC

(57) ABSTRACT

Embodiments herein relate to a non-aqueous liquid foul release coating composition for controlling aqueous biofouling on man-made objects comprising a moisture curable polysiloxane comprising repeating units of according to formula (I) as described in the application
and at least one terminal or pendant group of according to formula (II) as described in the application;
and
at least one of a marine biocide or a non-volatile component comprising units selected from hydrocarbyl, heterocarbyl, halocarbyl, ether, ester, amide, ketone, siloxane, urethane or urea groups. Embodiments herein further relate to a substrate coated with such coating composition and to processes of use of such coating compositions to control aquatic biofouling of a man-made object.

21 Claims, No Drawings

(56) References Cited

FOREIGN PATENT DOCUMENTS

| | | | |
|---|---|---|---|
| JP | 2007238820 A | * | 9/2007 |
| KR | 20140127239 | | 11/2014 |
| KR | 20160003281 | | 1/2016 |
| WO | 9933927 | | 7/1999 |
| WO | 0011949 | | 3/2000 |
| WO | 2007122325 | | 11/2007 |
| WO | 2008055985 | | 5/2008 |
| WO | 2009106717 | | 9/2009 |
| WO | 2009106718 | | 9/2009 |
| WO | 2013103496 | | 7/2013 |
| WO | 2014096572 | | 6/2014 |
| WO | 2014131695 | | 9/2014 |
| WO | 2014177159 | | 11/2014 |
| WO | 2015082408 | | 6/2015 |
| WO | 2015100198 | | 7/2015 |
| WO | 2018134124 | | 7/2018 |

OTHER PUBLICATIONS

"Office Action," for Japanese Patent Application No. 2019-537343 mailed Sep. 23, 2020 (3 pages) with English Translation.
"Examination Report," for Brazilian Patent Application No. BR112019013971-0 mailed Jul. 11, 2022 (8 pages) With English Translation.

* cited by examiner

FOUL RELEASE COATING COMPOSITION

CROSS-REFERENCE TO RELATED APPLICATIONS

This is a national stage application under 35 U.S.C. § 371 of International Patent Application Serial No. PCT/EP2018/050711, entitled "FOUL RELEASE COATING COMPOSITION, SUBSTRATE COATED WITH SUCH COATING COMPOSITION, AND USE OF SUCH COATING COMPOSITION," filed Jan. 12, 2018, which claims priority from EP Application No. 17151859.0, filed on Jan. 17, 2017, the disclosures of which are hereby incorporated by reference herein in their entirety.

FIELD OF THE TECHNOLOGY

The embodiments herein relate to a non-aqueous liquid foul release coating composition for controlling aquatic biofouling on man-made objects, to a substrate coated with the coating composition, and to the use of the coating composition to control aquatic biofouling on man-made objects.

BACKGROUND

Man-made structures such as ship and boat hulls, buoys, drilling platforms, dry dock equipment, oil production rigs, aquaculture equipment and netting and pipes which are immersed in water, or have water running through them, are prone to fouling by aquatic organisms such as green and brown algae, barnacles, mussels, and the like. Such structures are commonly of metal, but may also comprise other structural materials such as concrete, glass re-enforced plastic or wood. This fouling is a nuisance on boat hulls, because it increases frictional resistance during movement through the water, the consequence being reduced speeds and increased fuel consumption. It is a nuisance on static structures such as the legs of drilling platforms and oil and gas production, refining and storage rigs, firstly because the resistance of thick layers of fouling to waves and currents can cause unpredictable and potentially dangerous stresses in the structure, and, secondly, because fouling makes it difficult to inspect the structure for defects such as stress cracking and corrosion. It is a nuisance in pipes such as cooling water intakes and outlets, because the effective cross-sectional area is reduced by fouling, with the consequence that flow rates are reduced.

It is known, for example as disclosed in GB 1307001 and U.S. Pat. No. 3,702,778 that silicone rubber coatings resist fouling by aquatic organisms. It is believed that such coatings present a surface to which the organisms cannot easily adhere, and they can accordingly be called fouling release or fouling resistant rather than anti-fouling coatings. Silicone rubbers and silicone compounds generally have very low toxicity. The disadvantage of this anti-fouling system when applied to boat hulls is that although accumulation of marine organisms is reduced, there is the need for relatively high vessel speeds to remove all fouling species. Thus, in some instances, it has been shown that for effective release from a hull that has been treated with such a polymer it is necessary to sail with a speed of at least 14 knots.

WO 2014/131695 describes anti-fouling compositions comprising an organosiloxane-containing polymer and a fluorinated oxyalkylene-containing polymer or oligomer. The compositions typically comprise a tin-based curing catalyst.

Commercially available foul release coating systems based on polysiloxanes require a cure catalyst, which is typically a tin-based catalyst. Tin-based catalysts are faced with increasing disfavor due to toxicity issues associated with tin compounds. Other, less hazardous, catalysts are available; however they typically have a detrimental impact upon key coating attributes such as drying time, pot life or anti-fouling performance.

In US 2015/0329724 is described an anti-fouling coating composition comprising an organosiloxane-containing polymer with hydrolysable and condensable groups, a crosslinking agent, and a zinc complex as curing catalyst.

There is a need for foul release coatings providing improved protection against fouling, in particular at low vessel speed or under static conditions. There is also a need for foul release coatings having superior adhesion to substrates, compositions having an improved balance of usability after opening (pot life) and drying time, in particular when drying at low temperatures is required.

SUMMARY

The embodiments herein provide a foul release coating composition which removes or alleviates the above-mentioned problems.

Accordingly the embodiments herein provide in a first aspect a non-aqueous liquid foul release coating composition for controlling aquatic biofouling on man-made objects comprising i) a moisture curable polysiloxane comprising repeating units of formula (I)

and at least one terminal or pendant group of formula (II)

wherein $R^1$ and $R^2$ are, independently, organic groups having 1 to 20 carbon atoms; $R^3$ and $R^4$ are, independently, organic groups having 1 to 20 carbon atoms; A is an organic group having 1 to 50 carbon groups; $R^5$ is, independently, selected from organic groups having 1 to 20 carbon atoms and groups of the formula $O—R^6$ wherein $R^6$ is an organic group having 1 to 20 carbon atoms, with the proviso that at least one of $R^5$ is a group of the formula $O—R^6$, and ii) at least one of a marine biocide or a non-volatile component comprising units selected from hydrocarbyl, heterocarbyl, halocarbyl, ether, ester, amide, ketone, siloxane, urethane or urea groups.

The foul release coating compositions described herein provide coatings having improved anti-fouling performance compared to known anti-fouling coatings. Organisms cannot easily adhere to such coatings, even at low vessel speed or under static conditions. The coating compositions have an improved balance of usability (pot life) and drying time, in particular when drying at low temperatures is required, and the coatings show improved adhesion to substrates. The coating composition cures very well in the absence of a cure catalyst. Hence, tin-based cure catalysts or other catalysts are not required can be absent.

In a second aspect, the embodiments herein provide a substrate coated with a foul release coating composition according to a first aspect.

After the coating composition has been applied to a substrate and dried, cured or crosslinked, the coated substrate can be immersed and gives protection against fouling.

Therefore, in a third aspect, the embodiments herein provide a process of controlling aquatic biofouling of a man-made object, comprising the steps of:

a) applying the foul release coating composition according to the first aspect to at least a part of the surface of the man-made object;

b) curing the coating composition to form a cured coating layer; and c) immersing the man-made object at least partly in water.

In a final aspect, the embodiments herein provide the use of the foul release coating composition according to the first aspect to control aquatic biofouling on man-made objects.

DETAILED DESCRIPTION

The foul release coating compositions described herein include a liquid coating composition. This means that the composition is liquid at ambient temperature and can be applied to a substrate by well-known techniques, such as brushing, rolling, dipping, bar application or spraying.

In one embodiment, the coating composition comprises a volatile organic solvent to achieve the required application viscosity. In some embodiments, the coating composition may be essentially or entirely free of volatile organic solvent, for example when the polysiloxane is liquid and has a sufficiently low viscosity, or when reactive diluents or liquid plasticizers are included. The coating composition is a non-aqueous coating composition. This means that the composition is supplied in a form which is essentially free or entirely free of water. By essentially free of water it is meant that the composition comprises between 0 and 5% by weight, between 0 and 2% by weight of water, calculated on the total weight of the composition. The mentioned amounts of water may be unintentionally introduced by components included in the coating composition, for example by pigments or organic solvents which contain low amounts of water as impurity.

A component of the coating composition is a moisture curable polysiloxane comprising repeating units of formula (I)

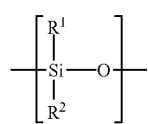

and at least one terminal or pendant group of formula (II)

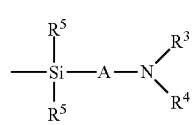

wherein $R^1$, $R^2$, $R^3$, $R^4$, $R^5$, $R^6$ and A are as specified hereinabove.

Organic groups are groups comprising at least one carbon atom. Generally, the organic groups $R^1$, $R^2$, $R^3$, $R^4$, $R^5$, $R^6$ and A are linear, branched or cyclic organic groups, for example aliphatic or aromatic organic groups. The definition of organic groups also encompasses oligo- or poly-siloxanes.

In one embodiment, $R^1$, $R^2$, $R^3$, $R^4$, $R^5$, $R^{6'}$ and A, are, independently, hydrocarbyl, heterocarbyl or halocarbyl groups.

$R^3$ and $R^4$ are organic groups having 1 to 20 carbon atoms. In one embodiment, the organic groups $R^3$ and $R^4$ are only indirectly linked to each other via the nitrogen atom in formula (II). In a further embodiment, the organic groups $R^3$ and $R^4$ are also directly linked to each other by a further covalent bond, thus representing a cyclic amine structure. By way of example, $R^3$ and $R^4$, together with the nitrogen atom of formula (II), may represent a pyrrolidine or a piperidine ring.

$R^3$ and $R^4$ are, independently, a linear, cyclic or branched aliphatic hydrocarbyl radical without hereoatoms, having 1 to 10 carbon groups, 1 to 8 carbon atoms. In one embodiment, $R^3$ and $R^4$ each are a butyl group.

As used herein, the term 'hydrocarbyl' means a univalent group formed by removing a hydrogen atom from a hydrocarbon, such as a linear, branched, cyclic, aliphatic, aryl, aralkyl, or alkylaryl hydrocarbon, As used herein, the term 'heterocarbyl' means a hydrocarbyl group that comprises a heteroatom such as oxygen, sulfur, nitrogen or silicon incorporated within the chain or ring.

As used herein, the term 'halocarbyl' means a hydrocarbyl group wherein one or more hydrogen atoms have been substituted by a halogen atom, such as a fluorine, chlorine or bromine atom.

In formula (I) $R^1$ and $R^2$ are independently selected from linear, cyclic or branched organic groups having 1 to 20 carbon atoms. In one embodiment, the organic groups are hydrocarbyl groups without heteroatoms. Alternatively, the organic groups may comprise heteroatoms atoms or groups comprising heteroatoms, such as ether, ester, amide, sulfide, haloalkyl, siloxane, urethane or urea groups. In some embodiments, each of $R^1$ and $R^2$ is, independently, a methyl group or a phenyl group.

In formulae (II) and (III) the $R^5$ groups are suitably selected from linear, cyclic or branched aromatic or aliphatic organic groups having 1 to 20 carbon atoms and groups of the formula $O-R^6$, wherein $R^6$ is a linear, cyclic or branched aliphatic organic group having 1 to 20 carbon atoms, with the proviso that at least one $R^5$ group is a group of the formula $O-R^6$. The linear, cyclic or branched aromatic or aliphatic organic can be alkyl groups having 1 to 6 carbon atoms.

The presence of groups of the formula $O-R^6$ provides moisture curability to the polysiloxane. In some embodiments, at least two of the $R^5$ groups are groups of the formula O—R$^6$. In other embodiments, R$^5$ groups are selected from C$_1$ to C$_4$ alkoxy groups, particularly ethoxy groups.

Suitable moisture curable polysiloxanes can be prepared by reaction of hydroxyl functional polysiloxanes having repeating units of formula (I) as defined above, and an aminosilane of formula (III)

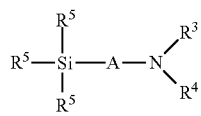
(III)

wherein R$^3$ to R$^5$ and A are as defined above, and wherein at least one R$^5$ group is a group of the formula O—R$^6$. Such a reaction is described in Chinese patent publication CN 101134887, which is herein incorporated by reference. This document describes the reaction of an α,ω-dihydroxy polydimethyl siloxane with an α-aminomethyl trialkoxysilane. In order to ensure a sufficient degree of conversion of the hydroxyl groups of the hydroxyl functional polysiloxanes having repeating units of formula (I) and the aminosilane of formula (III), it may be advantageous to employ a molar excess of aminosilane of formula (III) during the reaction. Any unreacted excess of aminosilane may be removed after the reaction. However, it is also possible to retain any excess of unreacted aminosilane in the moisture curable polysiloxane. Any excess of aminosilane can participate as curing agent in the curing reaction once the coating composition is applied to a substrate. Furthermore, the aminosilane can lower the viscosity of the coating composition and reduce the need for volatile organic solvent as diluent. Therefore, in some embodiments, the coating composition herein further comprises an aminosilane of formula (III). The aminosilane of formula (III) may be used in any suitable amount, typically up to 10 wt % based on the weight of moisture curable polysiloxane, in the range of from 0.5 to 7 wt %, or from 1 to 5 wt %.

In one embodiment, group A in formulae (II) and (III) is a linear, cyclic or branched aliphatic organic group having 1 to 10 carbon atoms, a hydrocarbyl group without heteroatoms having 1 to 10 carbon atoms, or 1 to 8 carbon atoms, or 1 to 6 carbon atoms. Very good results have been obtained in embodiments wherein A is a methylene group (—CH$_2$—). Therefore, in some embodiments, A is a methylene group.

The moisture curable polysiloxane may be linear or branched. In one embodiment, the moisture curable polysiloxane is essentially linear and has two terminal groups of formula (II).

In one embodiment the moisture curable polysiloxane essentially consists of repeating units of formula (I) and terminal or pendant groups of formula (II). In an alternative embodiment, the moisture curable polysiloxane comprises other groups, which may form part of the main polymer chain or may be pendant from the main polymer chain. Examples of other groups include ether moieties, polyether moieties and fluorinated alkyl groups.

One of the advantages of the foul release coating compositions herein is that a curing catalyst is not required for the curing reaction of the moisture-curable polysiloxane to proceed after application of the composition to a substrate. Therefore, some embodiments do not to include a curing catalyst in the coating composition.

In an embodiment, the coating composition comprises an aminosilane of formula (III); group A in formulae (II) and (III) is a methylene group; and the coating composition does not comprise a curing catalyst. It has been found that in this embodiment, the aminosilane of formula (III) acts as a crosslinking agent (curing agent) to the extent that the coating composition cures within an acceptable time, also in the absence of a curing catalyst.

Nevertheless, it may be desirable under specific circumstances to further increase the curing rate by addition of curing catalysts to the coating composition.

Examples of suitable catalysts include carboxylic acid salts of various metals, such as tin, zinc, iron, lead, barium, and zirconium. Such salts include salts of long-chain carboxylic acids, for example dibutyltin dilaurate, dibutyltin dioctoate, iron stearate, tin (II) octoate, and lead octoate. Further examples of suitable catalysts include organobismuth and organotitanium compounds and organo-phosphates such as bis(2-ethyl-hexyl) hydrogen phosphate. Other possible catalysts include chelates, for example dibutyltin acetoacetonate. Further, the catalyst may comprise a halogenated organic acid which has at least one halogen substituent on a carbon atom which is in the [alpha]-position relative to the acid group and/or at least one halogen substituent on a carbon atom which is in the [beta]-position relative to the acid group, or a derivative which is hydrolysable to form such an acid under the conditions of the condensation reaction. Alternatively, the catalyst may be as described in any of WO2007122325 A1, WO2008055985 A1, WO2009106717 A2, WO2009106718 A2. It is also possible to use combinations of the above materials.

In addition to the moisture curable polysiloxane the coating composition comprises a second component to provide enhanced protection against fouling. The second component is a marine biocide or a non-volatile component comprising units selected from hydrocarbyl, heterocarbyl, halocarbyl, ether, ester, amide, ketone, siloxane, urethane or urea groups.

The biocide may be one or more of an inorganic, organometallic, metal-organic or organic biocide for marine or freshwater organisms. Examples of inorganic biocides include copper salts such as copper oxide, copper thiocyanate, copper bronze, copper carbonate, copper chloride, copper nickel alloys, and silver salts such as silver chloride or nitrate; organometallic and metal-organic biocides include zinc pyrithione (the zinc salt of 2-pyridinethiol-1-oxide), copper pyrithione, bis (N-cyclohexyl-diazenium dioxy) copper, zinc ethylene-bis(dithiocarbamate) (i.e. zineb), zinc dimethyl dithiocarbamate (ziram), and manganese ethylene-bis(dithiocarbamate) complexed with zinc salt (i.e. mancozeb); and organic biocides include formaldehyde, dodecylguanidine monohydrochloride, thiabendazole, N-trihalomethyl thiophthalimides, trihalomethyl thiosulphamides, N-aryl maleimides such as N-(2,4,6-trichlorophenyl) maleimide, 3-(3,4-dichlorophenyl)-1,1-dimethylurea (diuron), 2,3,5,6-tetrachloro-4-(methylsulphonyl) pyridine, 2-methylthio-4-butylamino-6-cyclopopylamino-s-triazine, 3-benzo[b]thien-yl-5,6-dihydro-1,4,2-oxathiazine 4-oxide, 4,5-dichloro-2-(n-octyl)-3(2H)-isothiazolone, 2,4,5,6-tetrachloroisophthalonitrile, tolylfluanid, dichlofluanid, diiodomethyl-p-tosylsulphone, capsciacin or a substituted capsciacin, N-cyclopropyl-N'-(1,1-dimethylethyl)-6-(methylthio)-1,3,5-triazine-2,4-diamine, 3-iodo-2-propynylbutyl carbamate, medetomidine, 1,4-dithiaanthraquinone-2,3-dicarbonitrile (dithianon), boranes such as pyridine triphenylborane, a 2-trihalogenomethyl-3-halogeno-4-cyano pyrrole derivative substituted in position 5 and optionally in position 1, such as 2-(p-chlorophenyl)-3-cyano-4-bromo-5-trifluoromethyl pyrrole (tralopyril), and a furanone, such as 3-butyl-5-(dibromomethylidene)-2(5H)-furanone, and mixtures thereof, macrocyclic lactones such as avermectins, for example avermectin B1, ivermectin, doramectin, abamectin, amamectin and selamectin, and quaternary ammonium salts such as didecyldimethylammonium chloride and an alkyldimethylbenzylammonium chloride.

Optionally, the biocide is wholly or partially encapsulated, adsorbed, entrapped, supported or bound. Certain biocides are difficult or hazardous to handle and are advantageously used in an encapsulated, entrapped, absorbed, supported, or bound form. Encapsulation, entrapment, absorption, support or binding of the biocide can provide a secondary mechanism for controlling biocide leaching from the coating system in order to achieve an even more gradual release and long lasting effect.

The method of encapsulation, entrapment, adsorption, support or binding of the biocide is not particularly limiting. Examples of ways in which an encapsulated biocide may be prepared for use herein include mono and dual walled amino-formaldehyde or hydrolysed polyvinyl acetate-phenolic resin capsules or microcapsules as described in EP1791424.

An example of a suitable encapsulated biocide is encapsulated 4,5-dichloro-2-(n-octyl)-3(2H)-isothiazolone marketed by Dow Microbial Control as Sea-Nine CR2 Marine Antifoulant Agent.

Examples of ways in which an absorbed or supported or bound biocide may be prepared include the use of host-guest complexes such as clathrates as described in EP0709358, phenolic resins as described in EP0880892, carbon-based adsorbents such as those described in EP1142477, or inorganic microporous carriers such as the amorphous silicas, amorphous aluminas, pseudoboehmites or zeolites described in EP1115282.

In view of environmental and health concerns linked to the use of biocides in coatings for the prevention of aquatic biofouling, the second component is not a marine biocide. In that case, the coating composition may be essentially or entirely free of a marine biocide. In an embodiment, enhanced protection against fouling is provided by a non-biocidal component, said non-biocidal component being a non-volatile component comprising units selected from hydrocarbyl, heterocarbyl, halocarbyl, ether, ester, amide, ketone, siloxane, urethane or urea groups.

A component is considered non-volatile if it does not boil at a temperature below 250° C., at atmospheric pressure. This component can be an incompatible fluid or grease. Examples include a silicone, organic or inorganic molecule or polymer, usually a liquid, but optionally also an organo-soluble grease or wax, which is immiscible (either wholly or partly) with the cured moisture-curable polysiloxane. It is believed that the non-volatile second component will become enriched at the surface of the cured coating layer and augment its foul release properties.

Suitable examples of the non-volatile second component of the coating composition include fluorinated polymers or oligomers, such as linear and branched trifluoromethyl fluorine end-capped perfluoropolyethers (e.g. Fomblin Y®, Krytox K® fluids, or Demnum S® oils); linear di-organo (OH) end-capped perfluoropolyethers (eg Fomblin Z DOL®, Fluorolink E®); low molecular weight polychlorotrifluoroethylenes (eg Daifloil CTFE® fluids). Other mono- and diorgano-functional end-capped fluorinated alkyl- or alkoxy-containing polymers or oligomers can also be used, such as carboxy- or ester-functional fluorinated alkyl- or alkoxy-containing polymers or oligomers.

Further examples of the second component of the coating composition include silicone oils, for example of the formula:

wherein each group Q represents a hydrocarbon radical having 1-10 carbon atoms and n is an integer such that the silicone oil has a viscosity of 20 to 5000 m Pa s. At least 10% of the groups Q are generally methyl groups and at least 2% of the groups Q are phenyl groups. In some embodiments, at least 10% of the —SiQ$_2$-O— units are methylphenylsiloxane units. In some embodiments the silicone oil is a methyl terminated poly (methylphenylsiloxane). The oil has a viscosity of 20 to 1000 m Pa s. Examples of suitable silicone oils are sold under the trademarks Rhodorsil Huile 510V100 and Rhodorsil Huile 550 by Bluestar Silicones.

Still further examples of the second component of the coating composition include sterol(s) and/or sterol derivative(s). Sterols and sterol esters are triterpenoids, which is a class of organic molecule derived from triterpene molecules. Sterols and sterol derivatives may be derived from natural sources, such as animals and plants. Examples of sterols include cholesterol, lanosterol, agnosterol, 7-dehydrocholesterol, cholecalciferol, desmosterol, lathosterol, cholestanol, coprastanol, campesterol, stigmasterol, sitosterol, avenasterol, stigmastenol, brassicasterol, 4-desmethyl sterols (i.e. with no substituent on carbon-4), 4α-monomethyl sterols and 4,4-dimethyl sterols, phytostanols (fully saturated), ergosterol, amyrin and cylcoartenol. Suitable mixtures comprising sterols and sterol derivatives are lanolin, acylated lanolin, alkoxylated lanolin, and lanolin oil.

Yet further examples of the second component of the coating include hydrophilic-modified polysiloxanes such as poly(oxyalkylene)-modified polysiloxane, for example a polysiloxane having grafted thereto poly(oxyalkylene) chains, a polysiloxane having incorporated in the backbone thereof poly(oxyalkylene) chains, or a polysiloxane having incorporated in the backbone thereof polyoxyalkylene chains and having grafted thereto polyoxyalkylene chains. Commercially available hydrophilic-modified polysiloxane oils of this type include DC5103, DC Q2-5097, DC193, DC Q4-3669, DC Q4-3667, DC57 and DC2-8692 (all Dow Corning) and BYK333.

In one embodiment, the second component ii) of the coating composition may become covalently linked to the moisture-curable polysiloxane i) when the coating is cured.

However, in some embodiments, the second component of the coating composition does not participate in the moisture induced curing reaction of the polysiloxane. Therefore, this component does not contain groups of formula (II).

In an alternative embodiment, a non-biocidal, non-volatile second component is combined with a marine biocide.

The foul release coating composition may also comprise further ingredients, such as fillers, pigments, wetting agents, dispersing agents, flow additives, rheology control agents, adhesion promoters, antioxidants, UV stabilizers, organic solvents, organic polymers, reactive diluents, plasticizers and catalysts.

Examples of suitable fillers are barium sulphate, calcium sulphate, calcium carbonate, silicas or silicates (such as talc, feldspar, and china clay), including pyrogenic silica, bentonite and other clays, and solid silicone resins, which are generally condensed branched polysiloxanes, such as a silicone resin comprising Q units of the formula $SiO_{4/2}$ and M units of the formula $R'''SiO_{1/2}$, wherein the $R'''$ substituents are selected from alkyl groups having 1 to 6 carbon atoms and the ratio of M units to Q units is in the range of 0.4:1 to 1:1. Some fillers such as fumed silica may have a thixotropic effect on the coating composition. The proportion of fillers may be in the range of from 0 to 25 wt %, based on the total weight of the coating composition. In some embodiments, the clay is present in an amount of 0 to 1 wt % and the thixotrope is present in an amount of 0 to 5 wt %, based on the total weight of the coating composition.

Examples of pigments include black iron oxide, red iron oxide, yellow iron oxide, titanium dioxide, zinc oxide, carbon black, graphite, red molybdate, yellow molybdate, zinc sulfide, antimony oxide, sodium aluminium sulfosilicates, quinacridones, phthalocyanine blue, phthalocyanine green, indanthrone blue, cobalt aluminium oxide, carbazoledioxazine, chromium oxide, isoindoline orange, bis-acetoaceto-tolidiole, benzimidazolone, quinaphthalone yellow, isoindoline yellow, tetrachloroisoindolinone, and quinophthalone yellow, metallic flake materials (e.g. aluminium flakes), or other so-called barrier pigments or anticorrosive pigments such as zinc dust or zinc alloys; or other so-called lubricant pigments such as graphite, molybdenum disulfide, tungsten disulphide or boron nitride. The pigment volume concentration can be in the range of 0.5-25%. The proportion of pigments may be in the range of from 0 to 25 weight %, based on the total weight of the coating composition.

Suitable solvents for use in the coating composition include aromatic hydrocarbons, alcohols, ketones, esters, and mixtures of the above with one another or an aliphatic hydrocarbon. Solvents can include ketones such as methyl isopentyl ketone and/or hydrocarbon solvents, such as xylene, trimethyl benzene, or aliphatic cyclic or acyclic hydrocarbons, as well as mixture thereof.

The coating composition can have a non-volatile content, defined as the weight percentage of non-volatile material in the coating composition, of at least 35 weight %, or at least 50 weight %, or at least 70 weight %. The non-volatile content can range up to 80 weight %, 90 weight %, 95 weight % and up to 100 weight %. The non-volatile content may be determined in accordance with ASTM method D2697.

In a second aspect, embodiments herein relate to a substrate coated with a foul release coating composition according to the first aspect. The coating composition can be applied to a substrate by techniques known in the art, such as brush, roller, dipping, bar application or spray (airless and conventional).

The coating composition according to the first aspect provides coatings with very good fouling-resistant and foul release properties. This makes these coating compositions very suitable for coating objects that are immersed in an aquatic environment, such as marine and aquaculture applications. The coating can be used for both dynamic and static structures, such as ship and boat hulls, buoys, drilling platforms, oil production rigs, a floating production storage and offloading vessel (FPSO), a floating storage and regasification unit (FSRU), a cooling water intake in a power plant, a fish net or a fish cage and pipes which are immersed in water.

The substrate suitably is a surface of any of these structures, such as a metal, concrete, wood, organic polymer, such as polyvinyl chloride or fiber-reinforced resin, substrate. Metal substrates, in particular steel, aluminium or bronze substrates, are particularly suitable substrates. In an alternative embodiment, the substrate is a surface of a flexible polymeric carrier foil. The coating composition is then applied to one surface of a flexible polymeric carrier foil, for example a polyvinyl chloride carrier foil, and cured, and subsequently the non-coated surface of the carrier foil is laminated to a surface of a structure to be provided with fouling-resistant and/or foul release properties, for example by use of an adhesive.

To achieve good adhesion to the substrate, the fouling-release coating composition can be applied to a substrate that is provided with a primer layer and/or a tie-coat layer. The primer layer may be deposited from any primer composition known in the art, for example an epoxy resin-based or polyurethane based primer composition. In some embodiments, the substrate is provided with a tie-coat layer deposited from a tie-coat composition, before applying a foul release coating layer deposited from the fouling-release coating composition. The tie-coat composition may be applied to the bare substrate surface, to a substrate surface still containing an aged layer of coating composition, or to a primed substrate surface.

Tie-coat compositions are known in the art. In an embodiment, the tie-coat layer is deposited from a tie-coat composition comprising a binder polymer with alkoxysilane functional groups capable of reacting with pendant alkoxy group(s) of moisture curable polysiloxane (i), in particular alkoxy groups O—$R^6$. Such tie-coat compositions are known in the art and for example described in WO99/33927. The binder polymer with curable alkoxysilane functional groups in the tie-coat composition may be any suitable binder polymer, for example polyurethane, polyurea, polyester, polyether, polyepoxy, or a binder polymer derived from ethylenically unsaturated monomers such as a polyacrylate.

In one embodiment, the substrate is coated with a multi-layer coating system comprising:
  optionally a primer layer applied to the substrate and deposited from a primer coating composition;
  a tie-coat layer applied to the substrate or to the optional primer layer, deposited from a tie-coat composition comprising an binder polymer with curable alkoxysilane functional groups; and
  a topcoat layer applied to the tie-coat layer, the topcoat layer deposited from a liquid foul release coating composition according to the first aspect.

The substrate to which the primer layer or, in case no primer layer is applied, the tie-coat layer is applied may be a bare substrate surface or a substrate surface still containing an aged layer of coating composition.

The binder polymer in the tie-coat composition can be a polyacrylate with curable alkoxysilane functional groups. The curable alkoxysilane functional groups can have the following general formula:

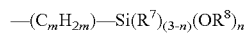

$$—(C_mH_{2m})—Si(R^7)_{(3-n)}(OR^8)_n$$

wherein n is 1, 2, or 3; or 2 or 3; $R^7$, $R^8$ are, independently, an alkyl radical having 1 to 6 carbon atoms, or 1 to 4 carbon atoms, or are ethyl or methyl; m is an integer with a value in the range of from 1 to 20, in the range of from 1 to 6. In some embodiments, m is 1 or 3, or m is 1. It has been found that if m is 1, adhesion between the tie-coat layer and the fouling-release coating deposited from the fouling-release coating composition according to the embodiments herein is obtained quicker than if m has a value larger than 1.

In some embodiments, the binder polymer in the tie-coat composition does not have crosslinkable functional groups other than the alkoxysilane functional groups.

In one embodiment, the binder polymer in the tie-coat composition is prepared by radical polymerisation of a mixture of acrylate and/or (meth)acrylate monomers of which at least one has alkoxysilane functionality, such as for example 3-(trimethoxysilylpropyl) methacrylate or trimethoxysilylmethyl methacrylate, or trimethoxysilylmethyl methacrylate. An example of such monomer mixture is a mixture of methyl methacrylate, lauryl methacrylate and trimethoxysilylmethyl methacrylate.

Accordingly, in a third aspect, there is provided a process of controlling aquatic biofouling of a man-made object, comprising the steps of:

a) applying the foul release coating composition according to the first aspect to at least a part of the surface of the man-made object;

b) curing the coating composition to form a cured coating layer; and c) immersing the man-made object at least partly in water.

In some embodiments, the process further comprises the step of applying a tie-coat layer deposited from a tie-coat composition as specified hereinabove on the at least part of the surface of the man-made object before applying the foul release coating composition. Before applying the tie-coat, the surface provided with a primer layer deposited from a primer coating composition as hereinbefore described.

The tie-coat composition can be a tie-coat composition as described above for the second aspect.

In a final aspect, there is provided the use of the foul release coating composition according to the first aspect to control aquatic biofouling on man-made objects.

EXAMPLES

Preparation of Resin A

Resin A is the reaction product of an α,ω-dihydroxy polydimethylsiloxane and an excess of (N,N-dibutylamino methyl)triethoxysilane The preparation of such resins is described in Chinese patent application CN 101134887 A.

Preparation of Coating Compositions

Coating compositions were prepared by high speed dispersion of the components mentioned below, wherein pbw means parts by weight.

Example 1 (Foul Release Coating Composition According to the Embodiments Herein)

| Component | pbw | Function |
| --- | --- | --- |
| Resin A | 57.7 | Resin/Cross-linker |
| Solvent naphtha (petroleum), light aromatic | 34.6 | Solvent |
| Black Iron Oxide | 0.4 | Colouring Pigment |
| Titanium dioxide | 1.7 | Colouring Pigment |
| Hydrophobic Fumed Silica | 1.0 | Thixotrope |
| Ethoxylated perfluoropolyether | 4.6 | Non-volatile fluid |

The composition could be used for at least 6 months after mixing when stored without access of atmospheric moisture.

Example 2 (Foul Release Coating Composition According to the Embodiments Herein)

| Component | pbw | Function |
| --- | --- | --- |
| Resin A | 62.0 | Resin/Cross-linker |
| Solvent naphtha (petroleum), light aromatic | 30.2 | Solvent |
| Black Iron Oxide | 0.4 | Colouring Pigment |
| Titanium dioxide | 1.8 | Colouring Pigment |
| Hydrophobic Fumed Silica | 1.0 | Thixotrope |
| Ethoxylated perfluoropolyether | 4.6 | Non-volatile fluid |

The composition could be used for at least 6 months after mixing when stored without access of atmospheric moisture.

Example 3 (Foul Release Coating Composition According to the Embodiments Herein)

| Component | pbw | Function |
| --- | --- | --- |
| Resin A | 57.1 | Resin/Cross-linker |
| Solvent naphtha (petroleum), light aromatic | 18.0 | Solvent |
| Dearomatised white spirit D40 | 12.0 | Solvent |
| Titanium dioxide | 7.8 | Colouring Pigment |
| Hydrophobic Fumed Silica | 1.0 | Thixotrope |
| Dimethyl, methyl(propyl(polyethylene oxide) acetate-capped) siloxane | 3.1 | Non-volatile fluid |

The composition could be used for at least 6 months after mixing when stored without access of atmospheric moisture.

Examples A and B (Comparative Foul Release Coating Compositions)

| Component | pbw A | pbw B | Function |
| --- | --- | --- | --- |
| Hydroxy terminated organosiloxane polymer | 60.0 | 64.9 | Resin |
| Hydrophobic Fumed Silica | 1.7 | 3.1 | Thixotrope |
| Titanium dioxide | 5.3 | 2.7 | Colouring Pigment |
| Black iron oxide | 1.1 | 0.6 | Thixotrope |
| Tetraethoxy silane | 2.7 | 4.4 | Curing agent |
| Xylene | 19.2 | 20.6 | Solvent |
| Diocyltin dilaurate | 0.5 | 0.5 | Catalyst |
| 2,4-pentanedione | 4.3 | 3.2 | Cure inhibitor |
| Ethoxylated perfluoropolyether | 5.2 | — | Non-volatile fluid |

The compositions could be used for a maximum of 1 hour after mixing. After this time the viscosity of the composition increased to a level that negatively impacted the application and the flow and leveling characteristics of the paint.

Preparation of Tie-Coat Compositions

Preparation of Tie-Coat Composition 1

A siloxane functional polyacrylate was prepared by copolymerizing a mixture of methyl methacrylate, lauryl methacrylate and trimethoxysilylpropyl methacrylate in the presence of mercaptopropyl trimethoxysilane as chain transfer agent and 2,2' azobis(2-methylbutyronitrile (AMBN) as initiator in methyl n-amyl ketone (MAK) as solvent at 100° C. The methyl methacrylate/lauryl methacrylate/trimethoxysilylpropyl methacrylate/mercaptopropyl trimethoxysilane molar ratio was 70/12/15/3. A solution of 70 wt % polymer in MAK was obtained.

Preparation of Tie-Coat Composition 2

A siloxane functional polyacrylate was prepared as described above for acrylic tie-coat composition 1, but with trimethoxysilylmethyl methacrylate instead of trimethoxysilylpropyl methacrylate.

Biofouling Testing

Marine grade plywood test panels were primed with Intershield 300 (International Paints Ltd) to give an average dry film thickness of about 100 µm. Intersleek 731 silicone elastomer tie-coat (International Paints Ltd) was then applied to give an average dry film thickness of about 100 µm and the tie-coat was allowed to dry. The coating compositions of Example 1, Example 2 and the Comparative Example A were then applied to the pre-treated panels in an average dry film thickness of about 150 µm.

The panels were then immersed in Singapore, at Changi Marina, an aquatic environment where heavy marine fouling growth is known to occur. After 74 weeks immersion an assessment was made of the board to quantify severity of animal fouling that was present. The results are shown in Table 1.

TABLE 1

Coverage of animal fouling on test coatings after 74 weeks immersion

| Coating | Average % animal fouling coverage |
|---|---|
| Example 1 | 9 |
| Example 2 | 10 |
| Example A | 36 |

Adhesion Testing 1

12×6" steel panels were degreased with solvent and then grit-blasted to SA2.5. Panels were then coated on both sides with Intersleek 717 Link Coat (International Paint Ltd) as a primer coating by airless spray, dried under ambient indoor conditions for 7 hours, and then coated on both sides with Intersleek 737 silicone elastomer tie-coat (International Paint Ltd) by airless spray. After drying for 1 day under ambient indoor conditions, one set of panels was coated on both sides by airless spray with the coating composition of Example 1, and a second set of panels was coated on both sides by airless spray with the composition of comparative Example A. The test panels were then immediately removed to an outside area and exposed to the ambient outdoor conditions in the winter of north east England for 48 hours.

The adhesion of the final coating to the previous coatings was qualitatively assessed by using a penknife blade to make a first 5 cm cut through the coatings to the steel substrate, followed by a second 5 cm cut across the first cut to make an 'X' shape. The intersection of the cuts was rubbed with a finger and the relative difficulty of delaminating the final coat from the previously applied coatings was noted. This allows the adhesion of different final coating layers to be ranked.

The coating layer prepared from Comparative Composition A was more easily delaminated from the previously applied coating layers than the coating prepared from Coating Composition 1 according to the embodiments herein. This demonstrated that the coating composition of Example 1 provides better adhesion than the comparative composition A.

Adhesion Testing 2

6×4" aluminium Q-panels were surface roughened using sandpaper and then degreased with solvent. Panels were then brush coated on both sides with tie-coat composition 1 or tie-coat composition 2. After drying for 1 day under ambient indoor conditions, one set of panels was brush coated on both sides with the coating composition of Example 3, and a second set of panels was brush coated on both sides with the comparative coating composition of Example B. The test panels were then immediately removed to an outside area and exposed to the ambient outdoor conditions in the winter of north east England for 96 hours.

After 5, 24, and 96 hours of exposure, adhesion of the final coating to the tie-coating was qualitatively assessed by using a penknife blade to cut through and remove a small section of the coatings down to the substrate. The exposed section was rubbed by a finger and the adhesion between tie-coat and topcoat was given a rating between 0 (poor adhesion)-5 (very good adhesion).

TABLE 2

Adhesion between tie-coat and foul-release coat

| Tie-coat | Top-coat | 5 h | 24 h | 96 h |
|---|---|---|---|---|
| Tie-coat composition 1 | Coating composition 3 | 0 | 3.5 | 3 |
| Tie-coat composition 1 | Comparative composition B | 0 | 3 | 3.5 |
| Tie-coat composition 2 | Coating composition 3 | 4 | 5 | 5 |
| Tie-coat composition 2 | Comparative composition B | 3.5 | 5 | 5 |

It can be summarized that the foul release coating compositions according to the embodiments herein can be used for a longer time after mixing (longer pot-life), provide coatings having improved anti-fouling properties and better adhesion than the comparative coating compositions.

The invention claimed is:

1. A non-aqueous liquid foul release coating composition for controlling aqueous biofouling on man-made objects comprising:
    i) a moisture curable polysiloxane comprising repeating units of formula (I)

and at least one terminal or pendant group of formula (II)

wherein $R^1$ and $R^2$ are, independently, selected from hydrocarbyl groups having 1 to 20 carbon atoms which optionally comprise heteroatoms or groups comprising heteroatoms, where the heteroatoms are selected from oxygen, sulfur, nitrogen and silicon, and the groups comprising heteroatoms are selected from ether, ester, amide, sulfide, haloalkyl, siloxane, urethane and urea;

R³ and R⁴ are, independently, selected from hydrocarbyl groups having 1 to 20 carbon atoms;

A is a methylene group;

R⁵ is an alkyl group having 1 to 6 carbon atoms or a group of formula O—R⁶

R⁶ is an alkyl group having 1 to 6 carbon atoms and ii) at least one of a marine biocide, or a non-volatile component comprising units selected from the group consisting of hydrocarbyl, heterocarbyl, halocarbyl, ether, ester, amide, ketone, siloxane, urethane or urea groups.

2. The non-aqueous liquid foul release coating composition of claim 1, wherein the coating composition further comprises an aminosilane of formula (III)

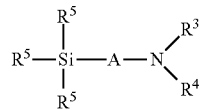

(III)

wherein R³ to R⁶ and A are defined as in claim 1.

3. The non-aqueous liquid foul release coating composition of claim 1, wherein component ii) does not contain groups of formula (II).

4. The non-aqueous liquid foul release coating composition of claim 1, wherein each of R¹ and R² is, independently, a methyl group or a phenyl group.

5. The non-aqueous liquid foul release coating composition of claim 1, wherein R⁵ and OR⁶ are both selected from $C_1$ to $C_4$ alkoxy groups.

6. The non-aqueous liquid foul release coating composition of claim 1, wherein the coating composition is essentially free or entirely free of a marine biocide.

7. The non-aqueous liquid foul release coating composition of claim 1, wherein the coating composition comprises a volatile organic solvent.

8. The non-aqueous liquid foul release coating composition of claim 1, having a non-volatile content in the range of 70 to 100% by weight.

9. A process for controlling aquatic biofouling of a man-made object, comprising the steps of:
a) applying the foul release coating composition of claim 1 to at least a part of the surface of the man-made object;
wherein R¹ and R² are, independently, organic groups having 1 to 20 carbon atoms; R³ and R⁴ are, independently, organic groups having 1 to 20 carbon atoms; A is an organic group having 1 to 50 carbon groups; R⁵ is, independently, selected from organic groups having 1 to 20 carbon atoms and groups of the formula O—R⁶ wherein R⁶ is an organic group having 1 to 20 carbon atoms, with the proviso that at least one R⁵ is a group of the formula O—R⁶; and
ii) at least one of a marine biocide or a non-volatile component comprising units selected from hydrocarbyl, heterocarbyl, halocarbyl, ether, ester, amide, ketone, siloxane, urethane or urea groups;

b) curing the coating composition to form a cured coating layer; and
c) immersing the man-made object at least partly in water.

10. The process of claim 9, further comprising the step of applying a tie-coat layer deposited from a tie-coat composition on the at least part of the surface of the man-made object before applying the foul release coating composition.

11. The non-aqueous liquid foul release coating composition of claim 1, wherein the non-volatile component is selected from the group consisting of fluorinated polymers and oligomers, silicone oils, sterols and sterol derivatives, and hydrophilic-modified polysiloxanes.

12. The non-aqueous liquid foul release coating composition of claim 1, wherein R¹ and R² are, independently, selected from hydrocarbyl groups having 1 to 20 carbon atoms which comprise heteroatoms or groups comprising heteroatoms, where the heteroatoms are selected from oxygen, sulfur, nitrogen and silicon.

13. The non-aqueous liquid foul release coating composition of claim 2, wherein each of R¹ and R² is, independently, a methyl group or a phenyl group.

14. The non-aqueous liquid foul release coating composition of claim 2, wherein R⁵ and OR⁶ are both selected from $C_1$ to $C_4$ alkoxy groups.

15. The non-aqueous liquid foul release coating composition of claim 1, comprising between 0 and 5 wt % water.

16. The non-aqueous liquid foul release coating composition of claim 1, wherein R³ and R⁴ are independently selected from linear, cyclic or branched aliphatic hydrocarbyl groups having 1 to 10 carbon atoms.

17. The non-aqueous liquid foul release coating composition of claim 2, wherein R³ and R⁴ are independently selected from linear, cyclic or branched aliphatic hydrocarbyl groups having 1 to 10 carbon atoms.

18. The non-aqueous liquid foul release coating composition of claim 11, wherein the non-volatile component is selected from the group consisting of fluorinated polymers and oligomers, silicone oils and hydrophilic-modified polysiloxanes.

19. The non-aqueous liquid foul release coating composition of claim 1, wherein:
each of R¹ and R² is, independently, a methyl group or a phenyl group;
R³ and R⁴ are independently selected from linear, cyclic or branched aliphatic hydrocarbyl groups having 1 to 10 carbon atoms
R⁵ and OR⁶ are both selected from $C_1$ to $C_4$ alkoxy groups;
the non-volatile component is selected from fluorinated polymers and oligomers, silicone oils and hydrophilic-modified polysiloxanes;
and wherein the non-aqueous foul release coating composition comprises between 0 to 5 wt % water and has a non-volatile content in the range of 70 to 100% by weight.

20. The non-aqueous liquid foul release coating composition of claim 19, further
comprising excess, unreacted aminosilane configured to act as a curing agent.

21. The non-aqueous liquid foul release coating composition of claim 1, wherein component (ii) does not participate in the moisture-induced curing reaction of the moisture-curable polysiloxane.

* * * * *

UNITED STATES PATENT AND TRADEMARK OFFICE
CERTIFICATE OF CORRECTION

PATENT NO. : 12,275,862 B2
APPLICATION NO. : 16/477159
DATED : April 15, 2025
INVENTOR(S) : David Moore et al.

Page 1 of 2

It is certified that error appears in the above-identified patent and that said Letters Patent is hereby corrected as shown below:

In the Claims

Claim 1 formula (II) currently reads:

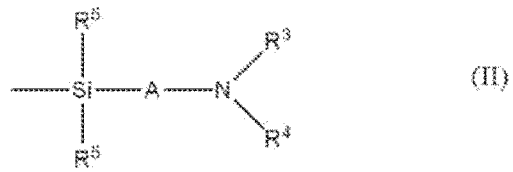

Should read:

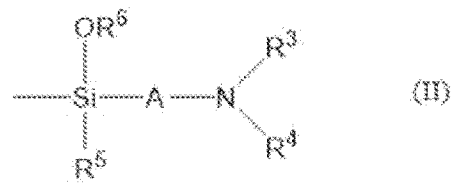

Claim 2 formula (III) currently reads:

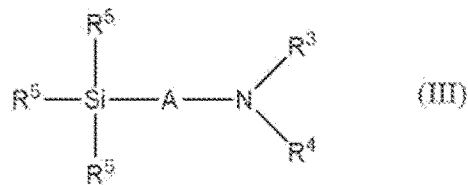

Should read:

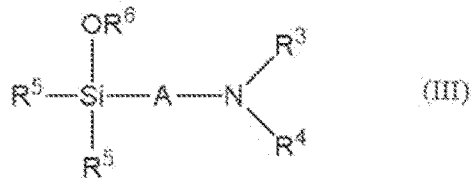

Signed and Sealed this
Fourteenth Day of October, 2025

John A. Squires
*Director of the United States Patent and Trademark Office*

CERTIFICATE OF CORRECTION (continued)
U.S. Pat. No. 12,275,862 B2

Claim 9 currently reads:
A process for controlling aquatic biofouling of a man-made object, comprising the steps of: a) applying the foul release coating composition of claim 1 to at least part of the surface of the man-made object; wherein R1 and R2 are, independently, organic groups having 1 to 20 carbon atoms; R3 and R4 are, independently, organic groups having 1 to 20 carbon atoms; A is an organic group having 1 to 50 carbon groups; R5 is, independently, selected from organic groups having 1 to 20 carbon atoms and groups of the formula O-R6 wherein R6 is an organic group having 1 to 20 carbon atoms, with the proviso that at least one R5 is a group of the formula O-R6; and ii) at least one of a marine biocide or a non-volatile component comprising units selected from hydrocarbyl, heterocarbyl, halocarbyl, ether, ester, amide, ketone, siloxane, urethane or urea groups; b) curing the coating composition to form a cured coating layer; and c) immersing the man-made object at least partly in water.

Should read:
A process for controlling aquatic biofouling of a man-made object, comprising the steps of:
a) applying the foul release coating composition of claim 1 to at least part of the surface of the man-made object; b) curing the coating composition to form a cured coating layer; and c) immersing the man-made object at least partly in water.